(12) United States Patent
Bauer

(10) Patent No.: US 8,022,661 B1
(45) Date of Patent: Sep. 20, 2011

(54) BATTERY OVER-DISCHARGE PROTECTION WITH DEAD-BUS RECOVERY

(75) Inventor: Robert D. Bauer, Langhorne, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 397 days.

(21) Appl. No.: 12/425,346

(22) Filed: Apr. 16, 2009

Related U.S. Application Data

(60) Provisional application No. 61/048,443, filed on Apr. 28, 2008.

(51) Int. Cl.
*H01M 10/44* (2006.01)
(52) U.S. Cl. ....................................................... 320/101
(58) Field of Classification Search .................... 320/101
See application file for complete search history.

(56) References Cited

U.S. PATENT DOCUMENTS

| | | | |
|---|---|---|---|
| 3,543,043 A | 11/1970 | Dunn | |
| 5,177,426 A | 1/1993 | Nakanishi et al. | |
| 5,304,915 A | 4/1994 | Sanpei et al. | |
| 5,397,974 A | 3/1995 | Tamai et al. | |
| 5,569,550 A | 10/1996 | Garrett et al. | |
| 5,898,293 A | 4/1999 | Tamai et al. | |

*Primary Examiner* — Reena Aurora
(74) *Attorney, Agent, or Firm* — McDermott Will & Emery LLP

(57) ABSTRACT

A battery and photovoltaic based power system comprises a power bus, a battery, a battery circuit, a photovoltaic circuit, a photovoltaic diode, and a switch control. The power bus comprises a supply side and a return side. The battery is coupled to the return side. The battery circuit couples the battery to the supply side and comprises a switch and a diode in parallel with the switch. The photovoltaic circuit is coupled to the return side and comprises a photovoltaic array and a second switch in parallel with the photovoltaic array. The second switch opens if the supply side is substantially depleted of power. The photovoltaic diode is connected in series with the photovoltaic circuit, with a cathode of the photovoltaic diode coupled to the supply side. The switch control monitors one or more battery parameters and controls the switch based on the one or more battery parameters.

20 Claims, 3 Drawing Sheets

BATTERY OVER-DISCHARGE PROTECTION WITH DEAD-BUS RECOVERY

CROSS-REFERENCES TO RELATED APPLICATIONS

The present application claims the benefit of U.S. Provisional Patent Application Ser. No. 61/048,443, entitled "SPACECRAFT BATTERY OVERDISCHARGE PROTECTION WITH DEAD-BUS RECOVERY," filed on Apr. 28, 2008, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to batteries and, in particular, relates to battery over-discharge protection with dead-bus recovery.

BACKGROUND

A battery is a combination of one or more electrochemical Galvanic cells which store chemical energy that can be converted into electric potential energy, creating electricity. Batteries may be classified into two categories. Primary batteries irreversibly transform chemical energy to electrical energy. When the initial supply of reactants is exhausted, energy cannot be readily restored to the battery by electrical means. Secondary batteries can be recharged. That is, the chemical reactions of the secondary batteries can be reversed by supplying electrical energy to the cell, restoring the original composition of the secondary batteries. Some secondary batteries are not indefinitely rechargeable due to dissipation of the active materials, loss of electrolyte and internal corrosion.

SUMMARY

In accordance with one aspect of the subject technology, a power system is provided to protect batteries from detrimental over-discharge and to allow the power system to recover from a dead-bus condition (i.e., when the power bus is substantially depleted of power). In one aspect of the subject technology, battery switch circuitry is provided to prevent the battery from discharging before damage to the battery is sustained. According to another aspect of the subject technology, photovoltaic array circuitry is provided to supply available current from the photovoltaic array into the power bus to recover from a dead-bus condition.

According to one aspect of the subject technology, a battery and photovoltaic based power system is provided. The power system comprises a power bus. The power bus comprises a supply side and a return side. The power system also comprises a battery coupled to the return side, and a battery switch circuit coupling the battery to the supply side. The battery switch circuit comprises a battery switch and a battery diode in parallel with the battery switch. A cathode of the battery diode is coupled to the battery and an anode of the battery diode is coupled to the supply side.

The power system also comprises a first photovoltaic array circuit coupled to the return side. The first photovoltaic array circuit comprises a first photovoltaic array and a first photovoltaic array switch in parallel with the first photovoltaic array. The first photovoltaic array switch is configured to open if the supply side is substantially depleted of power. The power system also comprises a first photovoltaic array diode connected in series with the first photovoltaic array circuit. A cathode of the first photovoltaic array diode is coupled to the supply side and an anode of the first photovoltaic array diode is coupled to the first photovoltaic array circuit. The power system also comprises a switch control module coupled to the battery, the battery switch, and the first photovoltaic array switch. The switch control module is configured to monitor one or more battery parameters and control the battery switch based on the one or more battery parameters.

According to another aspect of the subject technology, a battery and photovoltaic based power system is provided. The power system comprises a power bus. The power bus comprises a supply side and a return side. The power system also comprises a lithium ion battery coupled to the return side, and a battery switch circuit coupling the lithium ion battery to the supply side. The battery switch circuit comprises a battery switch and a battery diode in parallel with the battery switch. A cathode of the battery diode is coupled to the lithium ion battery and an anode of the battery diode is coupled to the supply side.

The power system also comprises a first photovoltaic array circuit coupled to the return side. The first photovoltaic array circuit comprises a first photovoltaic array and a field effect transistor in parallel with the first photovoltaic array. The field effect transistor is configured to open if the supply side is substantially depleted of power. The power system also comprises a first photovoltaic array diode connected in series with the first photovoltaic array circuit. A cathode of the first photovoltaic array diode is coupled to the supply side and an anode of the first photovoltaic array diode is coupled to the first photovoltaic array circuit. The power system also comprises a switch control module coupled to the lithium ion battery, the battery switch, and the field effect transistor. The switch control module is configured to monitor one or more battery parameters and control the battery switch based on the one or more battery parameters.

According to another aspect of the subject technology, a battery and photovoltaic powered vehicle is provided. The vehicle comprises a load and a power bus coupled to the load. The power bus is configured to supply power to the load. The power bus comprises a supply side and a return side. The vehicle also comprises a battery coupled to the return side, and a battery switch circuit coupling the battery to the supply side. The battery switch circuit comprises a battery switch and a battery diode in parallel with the battery switch. A cathode of the battery diode is coupled to the battery and an anode of the battery diode is coupled to the supply side.

The vehicle also comprises a first photovoltaic array circuit coupled to the return side. The first photovoltaic array circuit comprises a first photovoltaic array and a first photovoltaic array switch in parallel with the first photovoltaic array. The first photovoltaic array switch is configured to open if the supply side is substantially depleted of power. The vehicle also comprises a first photovoltaic array diode connected in series with the first photovoltaic array circuit. A cathode of the first photovoltaic array diode is coupled to the supply side and an anode of the first photovoltaic array diode is coupled to the first photovoltaic array circuit. The vehicle also comprises a switch control module coupled to the battery, the battery switch, and the first photovoltaic array switch. The switch control module is configured to monitor one or more battery parameters and control the battery switch based on the one or more battery parameters.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail so as not to obscure the present invention.

Figure 1:
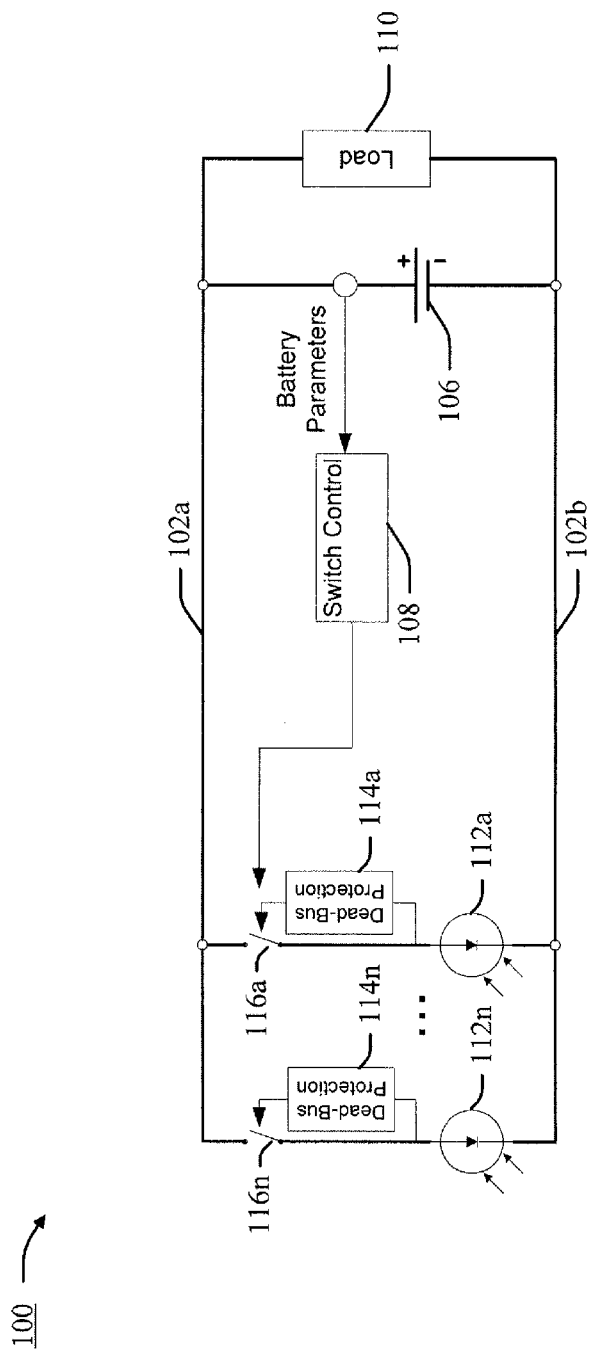
FIG. 1 illustrates an example of a battery and photovoltaic based power system.

FIG. 1 illustrates an example of a battery and photovoltaic based power system 100. As shown in FIG. 1, power system 100 comprises a battery dominated power bus architecture. In a battery dominated power bus architecture, the power bus is tied directly to the terminal of the battery. Hence, the voltage of the power bus is determined by the voltage of the battery (i.e., the voltage of the power bus is clamped to the voltage of the battery). A battery dominated power bus may be used for low power, low-Earth orbit (LEO) spacecraft missions due to its low cost and high reliability. Photovoltaic arrays can also be used to supply power to the power bus.

As shown in FIG. 1, power bus 102 comprises a supply side 102a (i.e., a power supply bus for supplying power) and a return side 102b (i.e., a power bus return for establishing a voltage difference to complete the circuit of power system 100. Battery 106 is connected directly to supply side 102a and to return side 102b. Thus, the voltage of power bus 102 is clamped to the voltage of battery 106. Power system 100 also comprises any number of photovoltaic arrays 112 (shown as photovoltaic arrays 112a to 112n), series switches 116 (shown as series switches 116a to 116n), and dead-bus protection circuits 114 (shown as 114a to 114n).

The current from photovoltaic arrays 112 (i.e., photovoltaic array current that is generated when photovoltaic arrays 112 are illuminated by either natural light or artificial light) that flows into supply side 102a is controlled by series switches 116. Load 110 is powered by the current from supply side 102a. Battery 106 can also be charged by the current from supply side 102a. A photovoltaic array switch control module 108 (i.e., a switch controller) monitors battery parameters, such as voltage, current, temperature, or other system parameters from battery 106, and controls series switches 116 based on one or more battery parameters or other factors in order to control the flow of charging current into battery 106.

For example, if photovoltaic array switch control module 108 determines that the charge remaining in battery 106 is low (e.g., approximately 90% or less of the charge capacity remaining), photovoltaic switch control module 108 may close one or more series switches 116 to supply more photovoltaic array current into supply side 102a, which in turn provides more current to charge battery 106, as well as supply current to load 110. Alternatively, if photovoltaic switch control module 108 determines that the charge remaining in battery 106 is high (e.g., approximately 95% or more of the charge capacity remaining), switch control module 108 may open one or more series switches 116 to supply less photovoltaic current into supply side 102a. Photovoltaic array switch control module 108 may open or close series switches 116 based on other factors such as the size of battery 106, how much photovoltaic array current is available, how much current load 110 is drawing from supply side 102a, or other factors.

One disadvantage suffered by power system 100 is that battery 106 may become over-discharged. Over-discharging a battery can cause various problems. For example, over-discharging a battery may cause an increase in the battery's internal resistance, resulting in difficulties in recharging the battery. In other cases, over-discharging a battery may cause the battery cells to short resulting in damage to the battery cells and a reduced capacity of the battery. The point at which a battery over-discharges varies from battery to battery, depending on the type of the battery, the size of the battery, how the battery is being used, or other factors. In some batteries, over-discharge may occur when less than approximately 10% of the charge capacity remains. In other batteries, over-discharge may occur when less than approximately 5% of the charge capacity remains.

Battery 106 can be over-discharged when there is insufficient photovoltaic array current supplied to supply side 102a to maintain the battery-state-of charge. This may occur when the photovoltaic arrays 112 do not receive enough illumination of light, such as when a spacecraft utilizing power system 100 travels behind the Earth away from the Sun or if the spacecraft is orientated in such a way that the sunlight is not appropriately hitting photovoltaic arrays 112. This over-discharge may not be a serious problem for nickel-hydrogen batteries, but for lithium ion batteries, it may cause irreparable damage. Lithium ion batteries may be preferred due to the reduced mass and cost of such batteries.

Another disadvantage suffered by power system 100 is that the system either cannot recover from a dead-bus condition or requires special circuitry to recover from such a condition. Dead-bus refers to a condition in which supply side 102a is substantially depleted of power. For example, a dead-bus condition may occur when there is no light illumination on photovoltaic arrays 112 and battery 106 becomes fully discharged. Dead-bus conditions are undesirable because there is no power to either charge the battery or power a load. A spacecraft utilizing power system 100, for example, may not have power to operate communication devices to communicate with a ground station under a dead-bus condition.

According to some approaches, series switches 116 are field effect transistors (FETs), which may be required to meet mission life and reliability requirements. When supply side 102a goes dead, the FETs go to an open state, which is the natural state of unpowered FETs. When photovoltaic arrays 112 become illuminated once again, the FETs will remain open if they are powered from supply side 102a. This is because there is no means to get the photovoltaic array current into supply side 102a with the FETs open. Special circuitry, such as dead-bus protection circuits 114, are required to power the FETs directly from photovoltaic arrays 112 under such circumstances. Such circuitry may complicate the system because the circuitry may require added components and high voltage components to handle the fairly wide range of voltages from photovoltaic arrays 112 when the photovoltaic arrays 112 are not connected to the supply side 102a. Such circuitry may also require circuitry to monitor the power in supply side 102a and control signals in photovoltaic array switch control module 108 to determine whether to open or close series switches 116.

Figure 2:
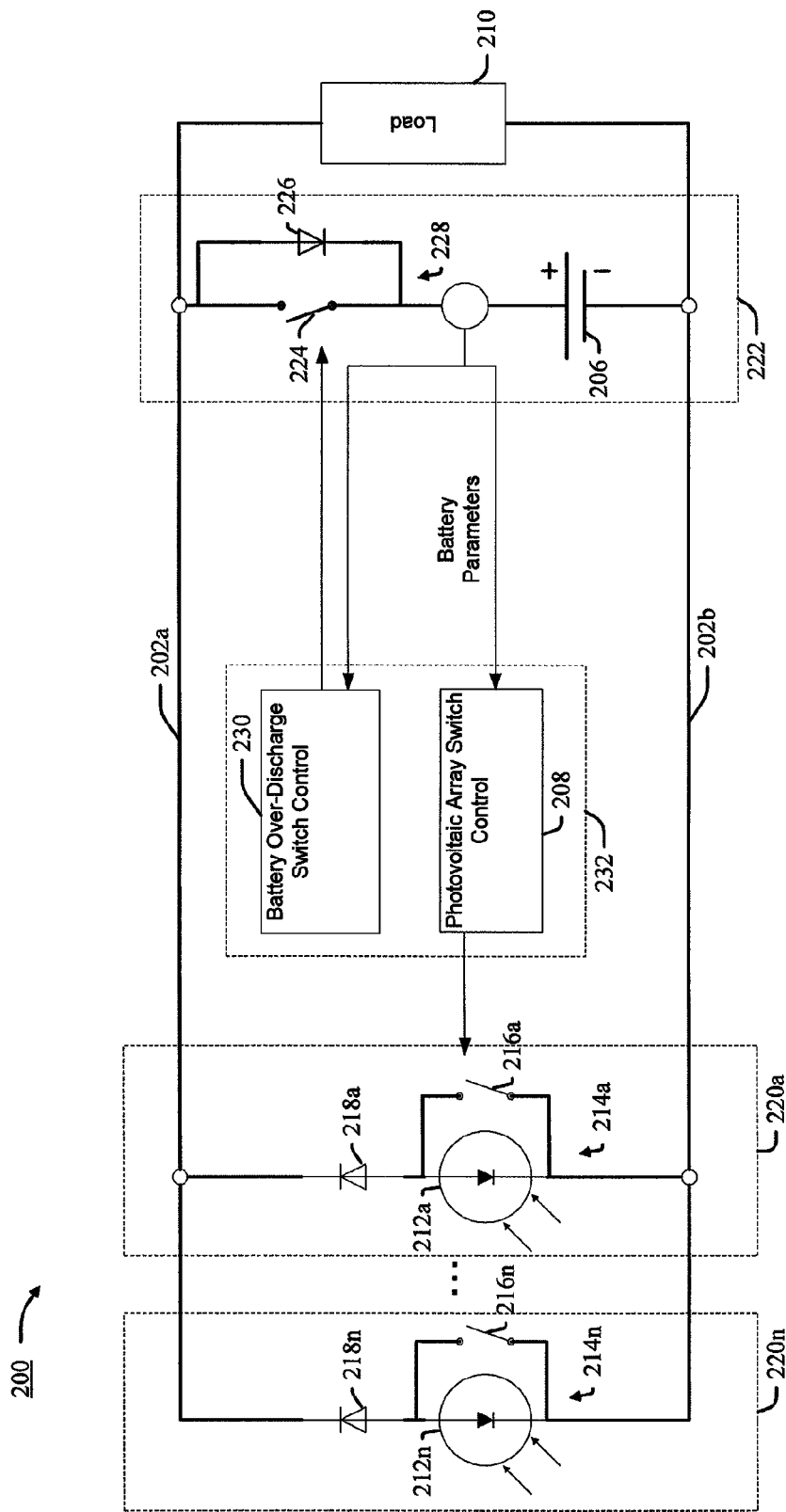
FIG. 2 illustrates an example of a battery and photovoltaic based power system, in accordance with one aspect of the subject technology.

FIG. 2 illustrates an example of a battery and photovoltaic based power system 200, in accordance with one aspect of the subject technology. Power system 200 provides battery over-discharge protection and dead-bus recovery.

Power system 200 comprises power bus 202 and battery unit 222 connected to power bus 202. Power bus 202 comprises a supply side 202a and a return side 202b. Battery unit 222 comprises battery 206 and battery switch circuit 228. Battery switch circuit 228 is connected in series with battery 206, and comprises battery switch 224 and battery diode 226, which is in parallel with battery switch 224. Power system 200 also comprises any number of photovoltaic array units 220 (shown as photovoltaic array units 220a to 220n), photovoltaic array circuits 214 (shown as photovoltaic array circuits 214a to 214n), photovoltaic arrays 212 (shown as photovoltaic arrays 212a to 212n), photovoltaic array switches 216 (shown as photovoltaic array switches 216a to 216n), and photovoltaic array diodes 218 (shown as photovoltaic array diodes 218a to 218n). Each photovoltaic array unit 220, which is connected to power bus, comprises a photovoltaic array circuit 214 and a photovoltaic array diode 218 connected in series with photovoltaic array circuit 214. Each photovoltaic array circuit 214 comprises a photovoltaic array 212 and a photovoltaic array switch 216, which is in parallel with photovoltaic array 212.

Power system 200 also comprises switch control module 232 which is connected to battery unit 222 and photovoltaic array units 220. Switch control module 232 comprises battery switch control module 230 (i.e., battery over-discharge switch control) and photovoltaic array switch control module 208 (i.e., a shunt control). Switch control module 232 is coupled to battery 206, battery switch 224, and photovoltaic array switches 216.

Over-Discharge Protection

According to one aspect of the subject technology, power system 200 provides over-discharge protection to battery 206 by having battery switch circuit 228 couple battery 206 to supply side 202a. Battery 206 may be a nickel-hydrogen battery, a lithium ion battery, or other secondary batteries. Battery 206 may comprise a single battery or an array of batteries linked together to form a battery source. Battery switch 224 may be an electronic switch or a mechanical switch. Battery switch control module 230 monitors battery parameters such as voltage, current, temperature, or other system parameters to determine how much charge is remaining in battery 206. If battery switch control module 230 detects that a charge remaining in battery 206 has dropped below an over-discharge threshold, battery switch control module 230 opens battery switch 224 so that current from battery 206 will not flow into supply side 202a, thus preventing further discharge of battery 206. Although battery 206 is still connected to supply side 202a (through battery diode 226), battery diode 226 is configured to prevent current from battery 206 from flowing into supply side 202a because of the direction of battery diode 226 (i.e., the cathode of battery diode 226 is coupled to battery 206 while the anode of battery diode 226 is coupled to supply side 202a). Battery diode 226 may comprise various diodes such as fast recovery diodes, Schottky diodes, or other suitable diodes.

The over-discharge threshold varies depending on a number of factors, including the factors described above with respect to the point at which batteries over-discharge. For example, an over-discharge threshold may vary depending on how accurate the readings of the battery parameters are, the type of battery being used (e.g., lithium ion batteries or nickel-hydrogen batteries), how essential load 210 is to justify drawing current from battery 206 to power load 210 even if it risks over-discharge of battery 206, or other factors. Essential loads, for example, may include communication devices to enable ground stations to communicate with a spacecraft utilizing power system 200, or other devices to ensure the basic operation of the spacecraft. In some aspects, an over-discharge threshold is approximately 10% of the charge capacity of battery 206. In other aspects, an over-discharge threshold is approximately 5% of the charge capacity of battery 206, which is even lower. For example, a lower over-discharge threshold may occur because some batteries are equipped to handle more discharge. In other examples, a lower over-discharge threshold may occur because photovoltaic arrays 212 are not providing enough power to supply side 202a, and the current from battery 206 is needed to power an essential load, thus justifying the continued discharge of battery 206 even if it risks over-discharging battery 206.

Still, in other aspects, if the readings of the battery parameters are known to be inaccurate, the over-discharge threshold may be relatively high, such as at approximately 15-20% of the charge capacity of battery 206. This is to provide extra assurance that battery 206 will not be over-discharged should the readings of the battery parameters prove to be wrong, resulting in an overestimation of the charge remaining. In another aspect, the over-discharge threshold may be relatively high, such as at approximately 15-20% of the charge capacity of battery 206, because load 210 may be quickly draining battery 206, and a higher threshold is necessary to ensure that battery 206 does not over-discharge. In one aspect, charge capacity may refer to the maximum charge that can be contained in battery 206 at the time of manufacture of battery 206. In another aspect, charge capacity may refer to the maximum charge that can be contained in battery 206 at any point in the life of battery 206.

According to another aspect of the subject technology, battery diode 226 is placed in parallel with battery switch 224 so that current from supply side 202a flows into battery 206 (and not the opposite way), even if battery switch 224 is open. Thus, the current from supply side 102a is used to recharge battery 206 even with battery switch 224 open. Photovoltaic arrays 212, if illuminated, provide available photovoltaic array current into supply side 202a. If battery switch control module 230 detects that a charge remaining in battery 206 is greater than a specified threshold (i.e., a closing threshold), battery switch control module 230 closes battery switch 224, allowing battery 206 to discharge. According to another aspect of the subject technology, battery diode 226 acts to clamp the voltage of power bus 202 to the voltage of battery 206. This maintains the voltage of power bus 202 within allowable limits for equipment operation when photovoltaic arrays 212 are illuminated and battery switch 224 is open.

The closing threshold varies depending on a number of factors. For example, the closing threshold may vary depending on how much photovoltaic array current is supplied to supply side 202a, whether there is enough charge in battery 206 to safely resume discharging battery 206 without quickly dropping below the over-discharge threshold, how essential load 210 is to justify drawing current from battery 206 to power load 210 even if battery 206 is not fully charged, or other factors. In some aspects, it is desirable to close the battery switch 224 as soon as possible, even when discharge is not needed, since the impedance of the closed battery switch 224 is lower than the battery diode 226, and hence less power may be lost and more power may be applied to recharge battery 206. In some aspects, the closing threshold is between approximately 20% and 30% of the charge capacity of battery 206. In some aspects, the closing threshold is even lower, for example at approximately 15% of the charge capacity of battery 206. This may occur, for example, when there is insufficient illumination on photovoltaic arrays 212 to provide photovoltaic array current into supply side 202a, and as a result, battery 206 is needed to discharge current into supply side 202a to provide power to load 210, which may be an essential load.

Dead-Bus Recovery

According to another aspect of the subject technology, power system 200 provides dead-bus recovery capability. Before the details of this dead-bus recovery capability are described, however, a description of the operation of photovoltaic array units 220 and photovoltaic array switch control module 208 is helpful. As shown in FIG. 2, photovoltaic array switches 216 are in parallel with photovoltaic arrays 212. Each photovoltaic array 212 may comprise a single photovoltaic cell or an array of photovoltaic cells. If any of photovoltaic array switches 216 are open, available photovoltaic array current (e.g., when photovoltaic arrays 212 are illuminated by light) may flow into supply side 202a. If any of photovoltaic array switches 216 are closed, the respective photovoltaic array circuit 214 becomes self-connected, which prevents any available photovoltaic array current from flowing into supply side 202a because the closed photovoltaic array switches 216 shunt the available photovoltaic array current. Additionally, photovoltaic array diodes 218 (i.e., blocking diodes) are provided to prevent current from supply side 202a from flowing into photovoltaic array circuits 214 because of the direction of photovoltaic array diodes 218 (i.e., the cathodes of photovoltaic array diodes 218 are coupled to supply side 202a while the anodes of photovoltaic array diodes 218 are coupled to photovoltaic array circuits 214, respectively). Specifically, photovoltaic array diodes 218 are provided to prevent photovoltaic array switches 216 from shunting the current from supply side 202a if photovoltaic array switches 216 are closed. Photovoltaic array diodes 218 may comprise various diodes such as fast recovery diodes, Schottky diodes, or other suitable diodes.

Photovoltaic array current may be applied or removed from supply side 202a by opening or closing photovoltaic array switches 216. Photovoltaic array switch control module 208 monitors battery parameters such as voltage, current, temperature, or other system parameters, and controls photovoltaic array switches 216 based on one or more battery parameters or other factors. Photovoltaic array switch control module 208 may operate similarly to photovoltaic array switch control module 108 shown in FIG. 1 except that photovoltaic array switch control module 208 opens one or more photovoltaic array switches 216 (rather than closing series switches 116) to supply more available photovoltaic current into supply side 202a. Conversely, photovoltaic array switch control module 208 closes one or more photovoltaic array switches 216 (rather than opening series switches 116) to provide less photovoltaic array current flowing into supply side 202a.

Regarding dead-bus recovery, power system 200 provides dead-bus recovery capability by using photovoltaic array switches 216 in parallel with photovoltaic arrays 212, respectively. According to one aspect of the subject technology, photovoltaic array switches 216 are FETs, which open automatically under a dead-bus condition. Photovoltaic array switches 216 may be other mechanical or electronic switches that are configured to open if supply side 202a is substantially depleted of power. By having photovoltaic array switches 216 open during a dead-bus condition, any photovoltaic array current that becomes available if photovoltaic arrays 212 become illuminated will flow into supply side 202a to recover from the dead-bus condition. Thus, photovoltaic array current may flow into supply side 202a, providing power to run load 210 (such as spacecraft equipment) and charge battery 206. Note that in this case, dead-bus protection circuits, such as dead-bus protection circuits 114 shown in FIG. 1, are not necessary, thus providing simplified circuitry for power system 200.

Consider, as an example, when photovoltaic arrays 212 are not illuminated. The photovoltaic switch control module 208 may open the photovoltaic array switches 216 since the battery parameters may indicate that charge has been removed from the battery 206. However, since the photovoltaic arrays 212 are not illuminated, power may not flow from the photovoltaic arrays 212 onto the supply side 202a. Thus, battery 206 provides current into supply side 202a with battery switch 224 closed, so that load 210 may continue to receive power from supply side 202a. However, as the charge in battery 206 drops, battery switch control module 230 may determine that the charge remaining in battery 206 has dropped below an over-discharge threshold, and battery switch 224 will be opened. In this case, a dead-bus condition is created and photovoltaic array switches 216 are open as FETs, regardless of whether photovoltaic array switches 216 were previously open or closed based on the operation of photovoltaic array switch control module 208. Should photovoltaic arrays 212 become illuminated by light, photovoltaic array current will flow into supply side 202a, thus providing recovery from the dead-bus condition.

According to one aspect of the subject technology, power system 200 uses less circuitry to provide dead-bus recovery and protects battery 206 from over-discharge. In one aspect of the subject technology, a spacecraft or a solar vehicle may comprise power system 200.

Figure 3:
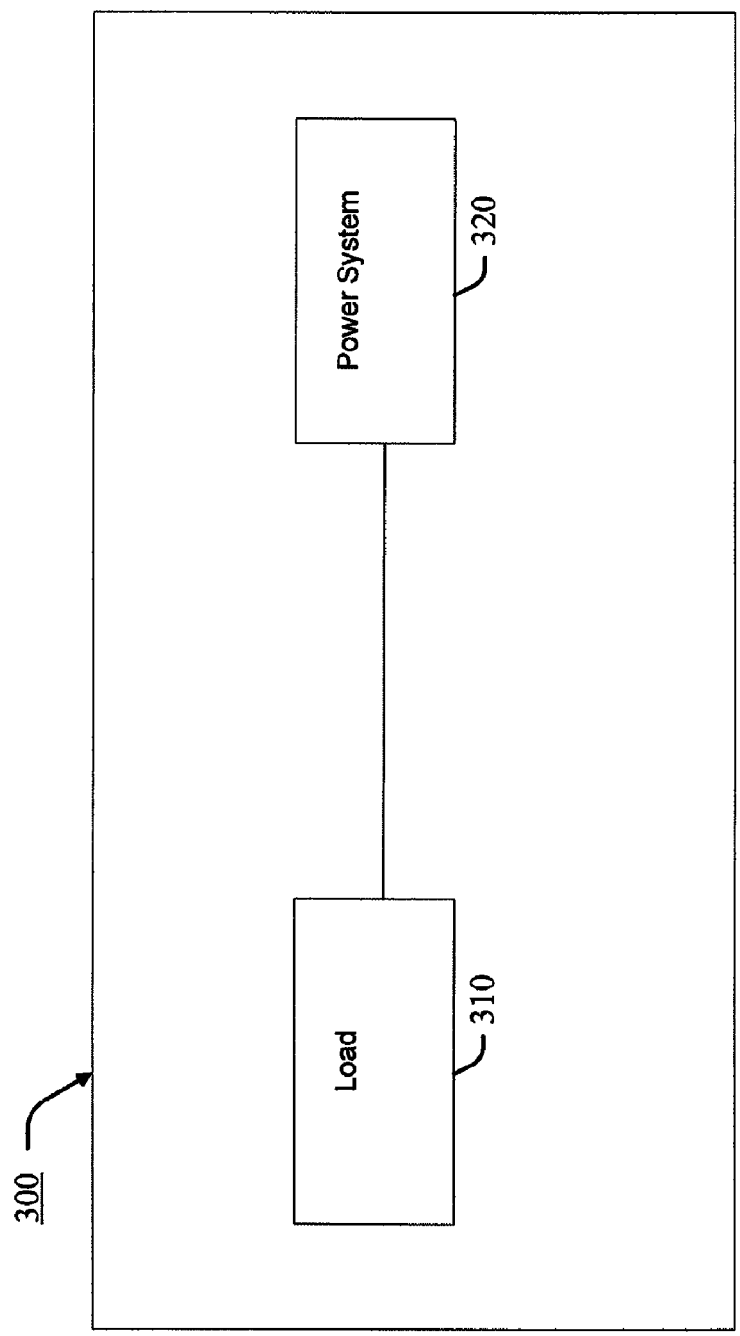
FIG. 3 is a block diagram illustrating an example of a vehicle utilizing a battery and photovoltaic based power system, in accordance with one aspect of the subject technology.

FIG. 3 is a block diagram illustrating an example of a vehicle 300 utilizing a battery and photovoltaic based power system, in accordance with one aspect of the subject technology. Vehicle 300 may comprise load 310 and power system 320. Power system 320, which is coupled to load 310, may supply power to load 310 according to the techniques described above. For example, power system 320 may be power system 200 shown in FIG. 2. Vehicle 300 may be any number of vehicles that can utilize power system 320. For example, vehicle 300 may comprise a spacecraft, a satellite, a solar-powered vehicle, an automobile, a boat, an aircraft, or other types of vehicles. The load 310 may comprise communication devices, cameras, motors, or any types of devices vehicle 300 may provide power to.

The foregoing description is provided to enable a person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A battery and photovoltaic based power system, comprising:
    a power bus comprising a supply side and a return side;
    a battery coupled to the return side;
    a battery switch circuit coupling the battery to the supply side, the battery switch circuit comprising a battery switch and a battery diode in parallel with the battery switch, wherein a cathode of the battery diode is coupled to the battery and an anode of the battery diode is coupled to the supply side;
    a first photovoltaic array circuit coupled to the return side, the first photovoltaic array circuit comprising a first photovoltaic array and a first photovoltaic array switch in parallel with the first photovoltaic array, wherein the first photovoltaic array switch is configured to open if the supply side is substantially depleted of power;
    a first photovoltaic array diode connected in series with the first photovoltaic array circuit, wherein a cathode of the first photovoltaic array diode is coupled to the supply side and an anode of the first photovoltaic array diode is coupled to the first photovoltaic array circuit; and
    a switch control module coupled to the battery, the battery switch, and the first photovoltaic array switch, the switch control module configured to monitor one or more battery parameters and control the battery switch based on the one or more battery parameters.

2. The power system of claim 1, wherein the switch control module is further configured to open the battery switch if a charge remaining in the battery drops below an over-discharge threshold.

3. The power system of claim 2, wherein the over-discharge threshold is approximately 5% of a charge capacity of the battery.

4. The power system of claim 1, wherein the switch control module is further configured to close the battery switch if a charge remaining in the battery is greater than a closing threshold.

5. The power system of claim 4, wherein the closing threshold is approximately 20% of a charge capacity of the battery.

6. The power system of claim 1, wherein the switch control module is further configured to open or close the first photovoltaic array switch based on the one or more battery parameters.

7. The power system of claim 1, wherein the first photovoltaic array switch comprises a field effect transistor.

8. The power system of claim 1, wherein the battery comprises a lithium ion battery.

9. The power system of claim 1, further comprising:
    a second photovoltaic array circuit coupled to the return side, the second photovoltaic array circuit comprising a second photovoltaic array and a second photovoltaic array switch in parallel with the second photovoltaic array, wherein the second photovoltaic array switch is configured to open if the supply side is substantially depleted of power; and
    a second photovoltaic array diode connected in series with the second photovoltaic array circuit, wherein a cathode of the second photovoltaic array diode is coupled to the supply side and an anode of the second photovoltaic array diode is coupled to the second photovoltaic array circuit, wherein
    the switch control module is coupled to the second photovoltaic array switch.

10. The power system of claim 9, wherein the switch control module is further configured to open or close the second photovoltaic array switch based on the one or more battery parameters.

11. A battery and photovoltaic based power system, comprising:
    a power bus comprising a supply side and a return side;
    a lithium ion battery coupled to the return side;
    a battery switch circuit coupling the lithium ion battery to the supply side, the battery switch circuit comprising a battery switch and a battery diode in parallel with the battery switch, wherein a cathode of the battery diode is coupled to the lithium ion battery and an anode of the battery diode is coupled to the supply side;
    a first photovoltaic array circuit coupled to the return side, the first photovoltaic array circuit comprising a first photovoltaic array and a field effect transistor in parallel with the first photovoltaic array, wherein the field effect transistor is configured to open if the supply side is substantially depleted of power;
    a first photovoltaic array diode connected in series with the first photovoltaic array circuit, wherein a cathode of the first photovoltaic array diode is coupled to the supply side and an anode of the first photovoltaic array diode is coupled to the first photovoltaic array circuit; and
    a switch control module coupled to the lithium ion battery, the battery switch, and the field effect transistor, the switch control module configured to monitor one or more battery parameters and control the battery switch based on the one or more battery parameters.

12. The power system of claim 11, wherein the switch control module is further configured to open the battery switch if a charge remaining in the lithium ion battery drops below an over-discharge threshold.

13. The power system of claim 12, wherein the over-discharge threshold is approximately 5% of a charge capacity of the lithium ion battery.

14. The power system of claim 11, wherein the switch control module is further configured to close the battery switch if a charge remaining in the lithium ion battery is greater than a closing threshold.

15. The power system of claim 14, wherein the closing threshold is approximately 20% of a charge capacity of the lithium ion battery.

16. The power system of claim 11, wherein the switch control module is further configured to open or close the field effect transistor based on the one or more battery parameters.

17. A battery and photovoltaic powered vehicle, comprising:
a load;
a power bus coupled to the load, the power bus configured to supply power to the load, the power bus comprising a supply side and a return side;
a battery coupled to the return side;
a battery switch circuit coupling the battery to the supply side, the battery switch circuit comprising a battery switch and a battery diode in parallel with the battery switch, wherein a cathode of the battery diode is coupled to the battery and an anode of the battery diode is coupled to the supply side;
a first photovoltaic array circuit coupled to the return side, the first photovoltaic array circuit comprising a first photovoltaic array and a first photovoltaic array switch in parallel with the first photovoltaic array, wherein the first photovoltaic array switch is configured to open if the supply side is substantially depleted of power;
a first photovoltaic array diode connected in series with the first photovoltaic array circuit, wherein a cathode of the first photovoltaic array diode is coupled to the supply side and an anode of the first photovoltaic array diode is coupled to the first photovoltaic array circuit; and
a switch control module coupled to the battery, the battery switch, and the first photovoltaic array switch, the switch control module configured to monitor one or more battery parameters and control the battery switch based on the one or more battery parameters.

18. The vehicle of claim 17, wherein the vehicle comprises a spacecraft, a satellite, a solar-powered vehicle, an automobile, a boat, or an aircraft.

19. The vehicle of claim 17, wherein the load comprises communication devices, cameras, or motors.

20. The vehicle of claim 17, wherein the switch control module is further configured to open the battery switch if a charge remaining in the battery drops below an over-discharge threshold.

* * * * *